US008646819B2

(12) United States Patent
Do et al.

(10) Patent No.: US 8,646,819 B2
(45) Date of Patent: Feb. 11, 2014

(54) ROTARY-HANDLE LATCH

(75) Inventors: Thai Do, Laguna Niguel, CA (US); Chi Pan, Irvine, CA (US)

(73) Assignee: Alcoa Inc., Pittsburgh, PA (US)

( * ) Notice: Subject to any disclaimer, the term of this patent is extended or adjusted under 35 U.S.C. 154(b) by 224 days.

(21) Appl. No.: 13/285,323

(22) Filed: Oct. 31, 2011

(65) Prior Publication Data

US 2013/0106122 A1  May 2, 2013

(51) Int. Cl.
*E05C 3/14* (2006.01)

(52) U.S. Cl.
USPC .................. 292/228; 292/336.3; 292/DIG. 49

(58) Field of Classification Search
CPC  E05B 17/0029; E05B 65/0852; E05B 53/003
USPC ............. 292/7, 112, 122, 137, 159, 175, 228, 292/262, 300, 194, 195, 200, DIG. 31, 292/336.3, 213, 256.69, DIG. 49; 70/81, 91, 70/92
See application file for complete search history.

(56) References Cited

U.S. PATENT DOCUMENTS

| 3,917,327 | A | * | 11/1975 | Plasko .............................. 292/1 |
| 4,053,177 | A | | 10/1977 | Stammreich |
| RE31,935 | E | | 7/1985 | Poe |
| 4,641,868 | A | * | 2/1987 | Miron ......................... 292/336.3 |
| 4,828,299 | A | | 5/1989 | Poe |
| 4,911,488 | A | * | 3/1990 | Brackmann et al. .......... 292/216 |
| 5,228,730 | A | * | 7/1993 | Gokcebay et al. ............. 292/144 |
| 5,992,908 | A | * | 11/1999 | Yared et al. .................... 292/196 |
| 6,123,370 | A | | 9/2000 | Rozema |
| 7,504,601 | B2 | * | 3/2009 | Belmond et al. ........... 200/61.62 |

(Continued)

FOREIGN PATENT DOCUMENTS

| DE | 202220 B | 9/1908 |
| DE | 29807738 U1 | 7/1998 |
| EP | 1091059 A2 | 4/2001 |
| EP | 2031157 * | 4/2009 |
| EP | 2031157 E | 4/2009 |
| FR | 2397503 E | 7/1977 |

(Continued)

OTHER PUBLICATIONS

International Search Report and Written Opinion in connection with International Patent Application No. PCT/US2012/066039 "Pin Latch With Detection Device and Movable Catch-Pin and Intermediate Position With Automatic Return Mechanism" dated Feb. 25, 2013 (15 pages).

(Continued)

*Primary Examiner* — Carlos Lugo
*Assistant Examiner* — Nathan Cumar
(74) *Attorney, Agent, or Firm* — Greenberg Traurig, LLP

(57) ABSTRACT

A latch includes a base, a drive shaft and cam, and a handle attached pivotally to the drive shaft. The handle is moveable between a closed position, a pop-up position, and an open position. A slide plate is attached slidably to the base and engaged with the cam. A swivel arm is attached pivotally to the base and the slide plate. A bolt assembly is attached to the swivel arm, and a plunger is mounted within the base. In its closed position, the handle engages the plunger to engage a switch and the bolt assembly engages a structure. In the handle's pop-up position, the plunger moves to a retracted position and disengages the switch. When the handle is moved to the open position, the drive shaft and cam are rotated so that the slide plate slides and the swivel arm pivots to swing the bolt assembly away from the structure.

12 Claims, 6 Drawing Sheets

(56) References Cited

U.S. PATENT DOCUMENTS

| | | | |
|---|---|---|---|
| 7,857,362 B2 * | 12/2010 | Deblock | 292/216 |
| 2002/0000726 A1 * | 1/2002 | Zintler | 292/216 |
| 2002/0060459 A1 * | 5/2002 | Zintler | 292/216 |
| 2005/0087996 A1 | 4/2005 | Jackson et al. | |
| 2011/0109103 A1 | 5/2011 | Huston et al. | |

FOREIGN PATENT DOCUMENTS

| | | |
|---|---|---|
| FR | 2852049 A1 | 4/2003 |
| GB | 191493 | 1/1925 |
| GB | 1497982 A | 1/1978 |
| GB | 1537410 A | 10/2011 |
| WO | 2010/033026 B | 3/2010 |
| WO | 2010/149905 E | 12/2010 |

OTHER PUBLICATIONS

International Search Report and Written Opinion in connection with International Patent Application No. PCT/US2011/027671 Latch With Adjustable Handle (10 pages).

English language translation of WO 2010/149905 (8 pages).

International Search Report and Written Opinion in connection with International Patent Application No. PCT/US2011/024031 Side-Driven Action Pin Latch (11 pages).

Aerospace Latching Systems, Alcoa Fastening Systems, http://www.alcoa.com/fastening_systems/aerospace/en/product.asp?cat_id=213[]_id=500, pp. 1-12, 159-60 and i-iii (8 pages).

International Search Report and Written Opinion in connection with International Patent Application No. PCT/US2012/028418 "Pin Latch Having Intermediate Position" (13 pages).

Commonly owned U.S. Appl. No. 13/0437,717 "Latch with Adjustable Handle", filed Mar. 9, 2011 (18 pages).

Commonly owned U.S. Appl. No. 13/023,081 "Side-Driven Action Pin Latch", filed Feb. 8, 2011 (25 pages).

International Search Report and Written Opinion in connection with International Patent Application No. PCT/US2012/059206 "Rotary-Handle Latch" dated Jan. 18, 2013 (9 pages).

* cited by examiner

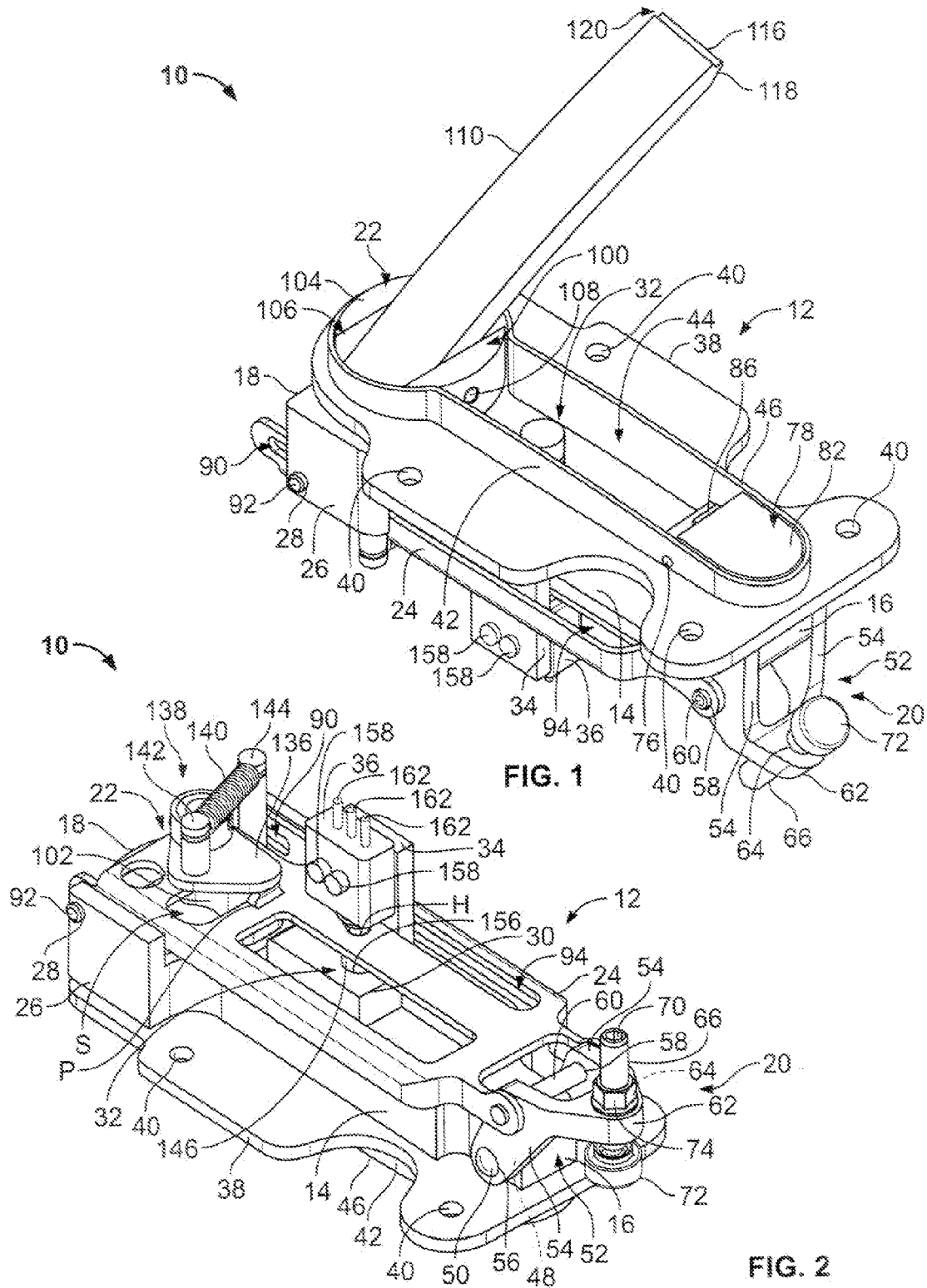

ROTARY-HANDLE LATCH

FIELD OF THE INVENTION

The present invention relates to a latch and, more particularly, to a rotary-handle latch.

BACKGROUND OF THE INVENTION

Transportation systems, such as aircraft, have one or more compartments that are accessed from the exterior of the aircraft. A locking or latching assembly is positioned on the access door of the compartment to enable a user to access the compartment. Such assemblies are accessed while the aircraft is on the ground. The latching assembly should securely maintain the access door in the closed position when the aircraft is in flight, and it should provide an indication that indicates that the access door is securely closed.

SUMMARY OF THE INVENTION

In an embodiment, a latch includes a base having a first end, a second end opposite the first end, a longitudinal axis extending from the first end to the second end, a swivel arm hub located proximate to the first end, and a rotary arm assembly hub located proximate to the second end; a rotary arm assembly supported by the rotary arm assembly hub, the rotary arm assembly including a drive shaft mounted rotatably within the rotary arm assembly hub and a cam attached to the drive shaft; a handle mechanism including a handle having a first end and a second end opposite the first end of the handle, and a trigger, wherein the second end of the handle is attached pivotally to the drive shaft of the rotary arm assembly such that the handle is moveable between a closed position, in which the trigger is releasably engaged with the second end of the handle, and a pop-up position, in which the trigger is disengaged from the second end of the handle and the second end of the handle is pivotally positioned in a direction away from the frame, and wherein the handle is moveable between the pop-up position and an open position, in which the handle is rotated relative to the longitudinal axis of the base; a slide plate having a first end and a second end opposite the first end of the slide plate, the second end of the slide plate being attached slidably to the second end of the base, and wherein the cam is engaged with the slide plate proximate to the second end of the slide plate; a swivel arm having a first portion attached pivotally to the swivel arm hub of the base and a second portion attached pivotally to the first end of the slide plate; a bolt assembly attached to the swivel arm; and a plunger assembly mounted within the base intermediate the first and second ends of the base, the plunger assembly including a plunger that is moveable between an extended position, in which the plunger is engaged with an electrical switch, and a retracted position, in which the plunger is disengaged from the electrical switch. In an embodiment, when the handle is in its closed position, the handle engages the plunger to maintain it in its closed position and the bolt assembly is engaged with an external structure, and when the handle is in its pop-up position, the handle is disengaged from the plunger and the plunger moves to its retracted position. In an embodiment, when the handle is moved from its pop-up position to its open position, the drive shaft and the cam are rotated such that the cam draws the slide plate in a direction towards the second end of the base, and, in turn, the swivel arm pivots to swing the bolt assembly to disengage the bolt assembly from the external structure.

In an embodiment, the plunger assembly includes a spring to facilitate movement of the plunger from its extended position to its retracted position. In an embodiment, the slide plate includes a hole formed intermediate with the first and second ends of the slide plate and is sized and shaped to receive the plunger of the plunger mechanism, wherein when the plunger is in its extended position, the plunger is positioned through the hole of the slide plate, and when the plunger is in its extended position, the plunger is positioned external of the hole. In an embodiment, the electrical switch provides a first signal indicating that the latch is in a locked position when the handle is in its closed position, and a second signal indicating that the latch is in an unlocked position when the handle is in its pop-up position or its open position. In an embodiment, the electrical switch includes an actuator button that is engaged by the plunger when the plunger is in its extended position, wherein when the plunger engages the actuator button, the electrical switch provides the first signal, and when the plunger is disengaged from the actuator button, the electrical switch provides the second signal. In an embodiment, the latch includes a mounting plate attached to the base, the electrical switch being mounted removably to the mounting plate.

In an embodiment, the bolt assembly includes a bolt, a ball attached to a first end of the bolt, and a swivel cap attached movably to the ball, the swivel cap engaging the external structure when the handle is in either its closed position or its pop-up position. In an embodiment, the bolt assembly includes a locknut threaded on a second end of the bolt opposite the first end of the bolt, and the locknut is adapted to adjust and lock the position of the bolt relative to the external structure.

In an embodiment, the slide plate includes a channel formed longitudinally with the plate, and the channel is sized and shaped to receive the mounting block. In an embodiment, the base includes at least one pin mounted proximate to the second end of the base, and the slide plate includes at least one elongated slot that is sized and shaped to receive the pin, and wherein the slide plate is guided by the pin. In an embodiment, the frame includes an outwardly projecting wall having an edge that is positioned flush with the external structure when the latch is installed therein. In an embodiment, the wall forms a well that is sized and shaped to receive the handle when the handle is in its closed position, and wherein when the handle is in its closed position, an exterior surface of the handle is positioned flush with the edge of the wall. In an embodiment, the handle mechanism includes a torsion spring engaged with the handle for biasing the handle toward its pop-up position.

In an embodiment, the trigger is attached rotatably to the base and includes a first lip, and the handle includes a second lip having a ramp and a groove, and when the handle is moved from its pop-up position to its closed position, the ramp of the handle bears against the lip of the trigger so as to rotate the trigger until the lip of the handle engages the lip of the trigger, thereby retaining the handle in its closed position in an embodiment, the trigger includes a spring that biases the trigger to bear on the groove of the handle to maintain the handle in its closed position.

BRIEF DESCRIPTION OF THE DRAWINGS

For a more complete understanding of the present invention, reference is made to the following detailed description of exemplary embodiments considered in conjunction with the accompanying drawings, in which:

FIG. 1 is a top perspective view of a rotary-handle latch constructed in accordance with an embodiment of the present invention, the rotary-handle latch being shown in an open position;

FIG. 2 is a bottom perspective view of the rotary-handle latch illustrated by FIG. 1, but being shown in a closed position;

DETAILED DESCRIPTION OF THE DRAWINGS

Figure 3:
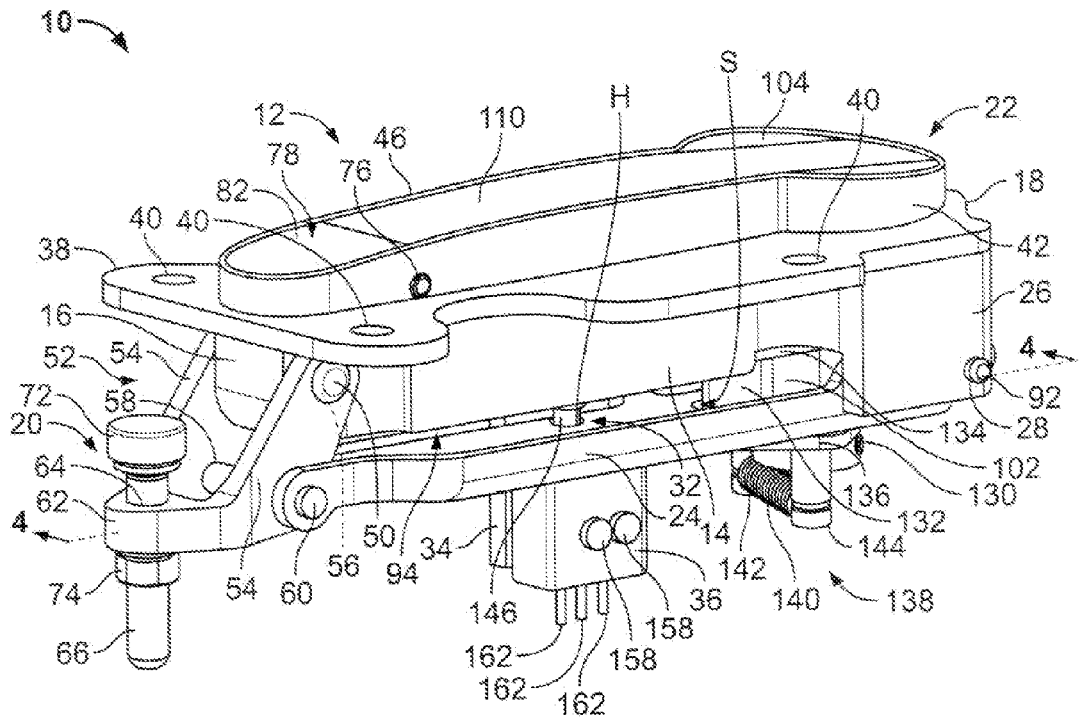
FIG. 3 is a top perspective view of the rotary-handle latch illustrated by FIG. 1, but being shown in the closed position.

FIGS. 1-5 illustrate a rotary-handle latch 10 (hereinafter referred to as "the latch 10") in accordance with an embodiment of the present invention. Although the present invention can be used in conjunction with a door that is used in connection with a variety of compartments, it is particularly suitable for use in connection with an external door to a compartment of an aircraft. Accordingly, the present invention will be described hereinafter in connection with such an external door to a compartment of an aircraft. It should be understood, however, that the following description is only meant to be illustrative of the present invention and is not meant to limit the scope of the present invention, which has applicability to other types of doors such as an external door to a compartment of other transportation systems (e.g., railcars, trucks, etc.) or storage systems.

In an embodiment, the latch includes a base 12 which serves as a rigid backbone that supports all of the elements of the latch 10 that are be described hereinafter. In an embodiment, the base 12 may be made of metal such as aluminum. In an embodiment, the base 12 may be fabricated in one piece to achieve a high strength-to-weight ratio and to maintain rigidity.

In an embodiment, the base 12 includes a frame 14 that has a swivel-arm hub 16 at one end and a rotary assembly hub 18 at the opposite end. In an embodiment, the swivel-arm hub 16 supports a latch assembly 20. In an embodiment, the rotary assembly hub 18 supports a rotary assembly 22. In an embodiment, a planar slide plate 24 interconnects the latch assembly 20 to the rotary assembly 22, as will be described hereinafter. In an embodiment, the frame 14 has two saddles 26 that flank the rotary assembly hub 18. In an embodiment, each saddle 26 includes a bore 28 that has a longitudinal axis that is perpendicular to the longitudinal axis of the latch 10. In an embodiment, the frame 14 has a centrally positioned block 30 that supports a plunger assembly 32. In an embodiment, a mounting plate 34 is fixedly fastened (e.g., by welds, screws; adhesives or other fastening means) to the frame 14, and a micro-switch 36 is attached removably to the mounting plate 34. In an embodiment, a planar flange 38 extends peripherally around the base 12. In an embodiment, the flange 38 has holes 40 formed therein such that bolts (not shown) are sized and shaped to be inserted in the holes 40 to facilitate the installation of the latch 10 in the door of the aircraft (not shown). In an embodiment, a wall 42 projects outwardly from the frame 14 to form a keyhole shaped well 44. In an embodiment, the wall 42 has an edge 46 which is sized and shaped so that when the latch 10 is installed in the door, the exterior surface of the wall 42 is positioned against the perimeter of the corresponding keyhole-shaped cutout in the exterior of the door, and the edge 46 is positioned flush with the exterior surface of the door (not shown in the Figures).

Continuing to refer to FIGS. 1-5, the end of the latch 10 that is proximate the swivel arm hub 16 is now described. In an embodiment, the swivel-arm hub 16 has a bore 48 (see FIG. 4) sized and shaped to receive a rivet 50 transversely positioned therein to support the latch assembly 20. In an embodiment, the longitudinal axis of the rivet 50 is perpendicularly oriented to the longitudinal axis of the latch 10. In an embodiment, the latch assembly 20 has a swivel arm 52 that is pivotally connected to the swivel arm hub 16 via the rivet 50. In an embodiment, the swivel arm 52 includes two spaced-apart arms 54, each of which includes a bore 56 formed therein. In an embodiment, the longitudinal axes of the bores 56 are oriented perpendicularly to the longitudinal axis of the latch 10. In an embodiment, the rivet 50 is positioned in the bores 56 of the arms 54 and the bore 48 of the swivel-arm hub 16, so that the swivel arm 52 may pivot freely about the rivet 50. In an embodiment, a bore 58 is positioned in the mid-section of each of the arms 54, the longitudinal axes of the bores 58 being perpendicularly oriented to the longitudinal axis of the latch 10. In an embodiment, a rivet 60, which is positioned in the bores 58 of the arms 54, pivotally connects the slide plate 24 to the latch assembly 20. In an embodiment, a boss 62 is formed at the point of convergence of the two arms 54. A threaded hole 64 (the threads are not shown) is formed in the boss 62. In an embodiment, a threaded bolt 66 is screwed in the hole 64. In an embodiment, the bolt 66 has a ball 68 formed on one end and a recess 70 is formed on the opposite end. In an embodiment, a cap 72 is fitted on the ball 68 of the bolt 66. In an embodiment, the cap 72 may be made out of a durable polymer material, and it may be formed with a recess R so that, when the recess R of the cap 72 is press-fitted on the ball 68, a ball joint is formed between the cap 72 and the ball 68 (see FIG. 4). In an embodiment, the cap 72 contacts the door jam of the aircraft compartment when the latch 10 is closed. In an embodiment, the cap 72 can swivel about the ball 68 to conform to the angular orientation of the door jam. In an embodiment, a locknut 74 is threaded on the bolt 66 so that it may lock the position of the bolt 66 on the boss 62. In an embodiment, the locknut 74 may loosen the bolt 66 so that a screwdriver may be applied to the recess 70 of the bolt 66 to screw the bolt 66 to remove any slack between the door jam and the cap 72 that may exist when the latch 10 is in the closed position. In another embodiment, the cap 72 is permanently fixed.

In an embodiment, a pivot pin 76 is installed transversely in the well 44, proximate the swivel arm hub 16. In an embodiment, a trigger 78 is pivotally mounted on the pivot pin 76 and is retained in the well 44. In an embodiment, a torsion spring 80 is also mounted on the pivot pin 76. In an embodiment, the trigger 78 has a push button 82 that is attached to a pair of collars 84. In an embodiment, a lip 86 is formed on the end of the push button 82 that is proximate the collars 84, while a foot 88 is attached to each of the collars 84 (see FIG. 4). In an embodiment, the pivot pin 76 extends through the collar 84, so that the trigger 78 may pivot about the pivot pin 76 in a seesaw manner. In an embodiment, the torsion spring 80 biases the trigger 78 to rotate in a direction that urges the push button 82 to rotate out of the well 44. However, the trigger 78 is sized and shaped so that when the feet 88 of the trigger 78 are in contact with the floor of the well 44 (for example see FIG. 4), the exterior surface of the push button 82 is positioned flush with the edge 46 of the wall 42.

Continuing to refer to FIGS. 1-5, the slide plate 24 is now described. More particularly, in an embodiment, the plane of the slide plate 24 may be oriented substantially parallel with the plane of the flange 38. In an embodiment, slots 90 are positioned in the slide plate 24, proximate to the rotary assembly hub 18. In an embodiment, a pin 92 is positioned in the bores 28 of the saddles 26 as well as in the slots 90 of the slide plate 24. In an embodiment, the slide-plate 24 can slide in the longitudinal direction of the latch 10 while the pin 92 continues to support the end of the slide plate 24 that is proximate the rotary assembly hub 18. In an embodiment, a slot 94, that is formed in the slide plate 24, provides clearance for the mounting plate 34 that extends through the slide plate 24 (for example see FIG. 2) when the slide plate 24 translates in the longitudinal direction. In an embodiment, a hole H is formed on the slide plate 24 to provide clearance for a portion of the plunger assembly 32 to extend through the slide plate 24 when handle 110 is in the closed position, as will be described hereinbelow. In an embodiment, the slide plate 24 includes, proximate to the rotary assembly 22, a protrusion P, an L-shaped slot S, and a slot 96.

Continuing to refer to FIGS. 1-5, the end of the latch 10 that is proximate to the rotary assembly hub 18 is now described. More particularly, in an embodiment, a bore 98 is formed in the rotary assembly hub 18 (see FIG. 4). In an embodiment, the longitudinal axis of the bore 98 is oriented substantially perpendicularly to the plane of the slide plate 24. In an embodiment, the rotary assembly 22 has a drive shaft 100 that is fitted to a cam 102. In an embodiment, the drive shaft 100 has a cylindrically-shaped head 104 that has a diameter greater than the diameter of the bore 98 so that the head 104 is pivotally supported by the frame 14. In an embodiment, a slot 106 is centrally formed in the head 104 of the drive shaft 100, and a pin 108 (see FIG. 1) is centrally positioned across the diameter of the head 104 and extends across the center of the slot 106.

Figure 4:
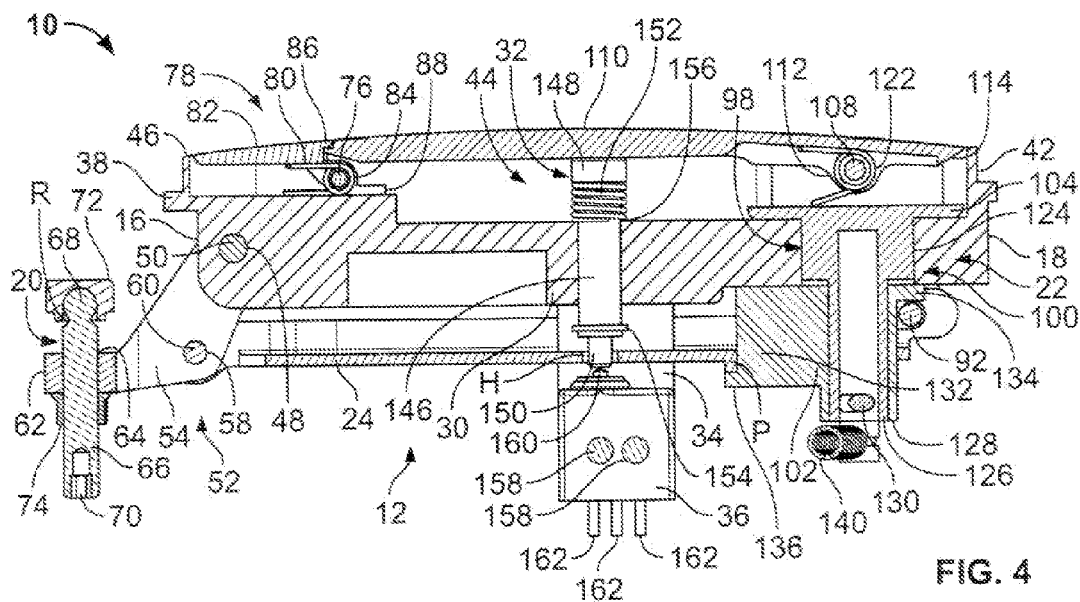
FIG. 4 is a cross-sectional view of the of the rotary-handle latch shown in FIG. 3, taken along the arrow 4-4 of FIG. 3 and looking in the direction of the arrows.
Figure 5:
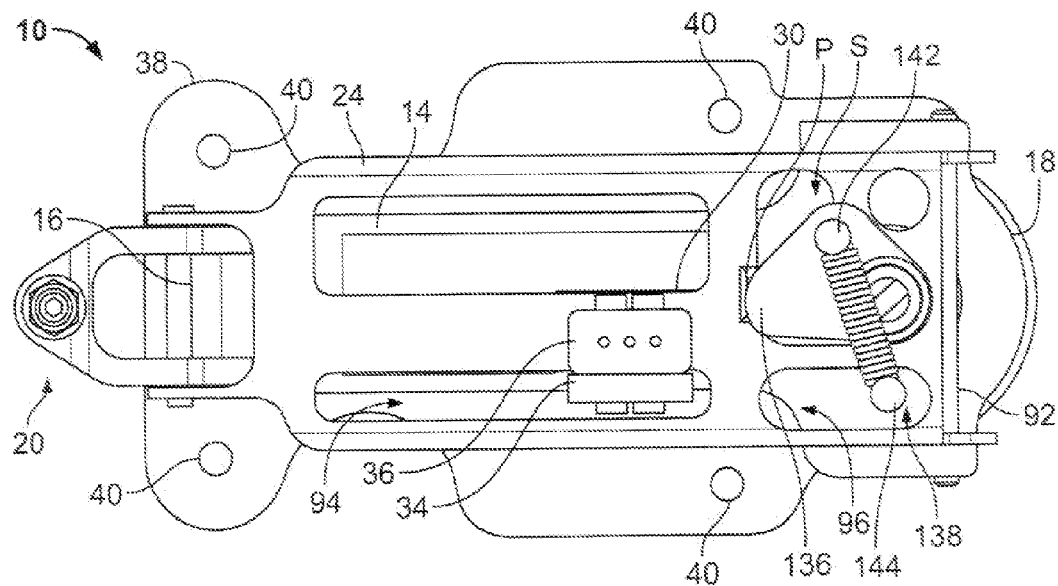
FIG. 5 is a bottom view of the rotary-handle latch shown in FIG. 3.
Figure 9:
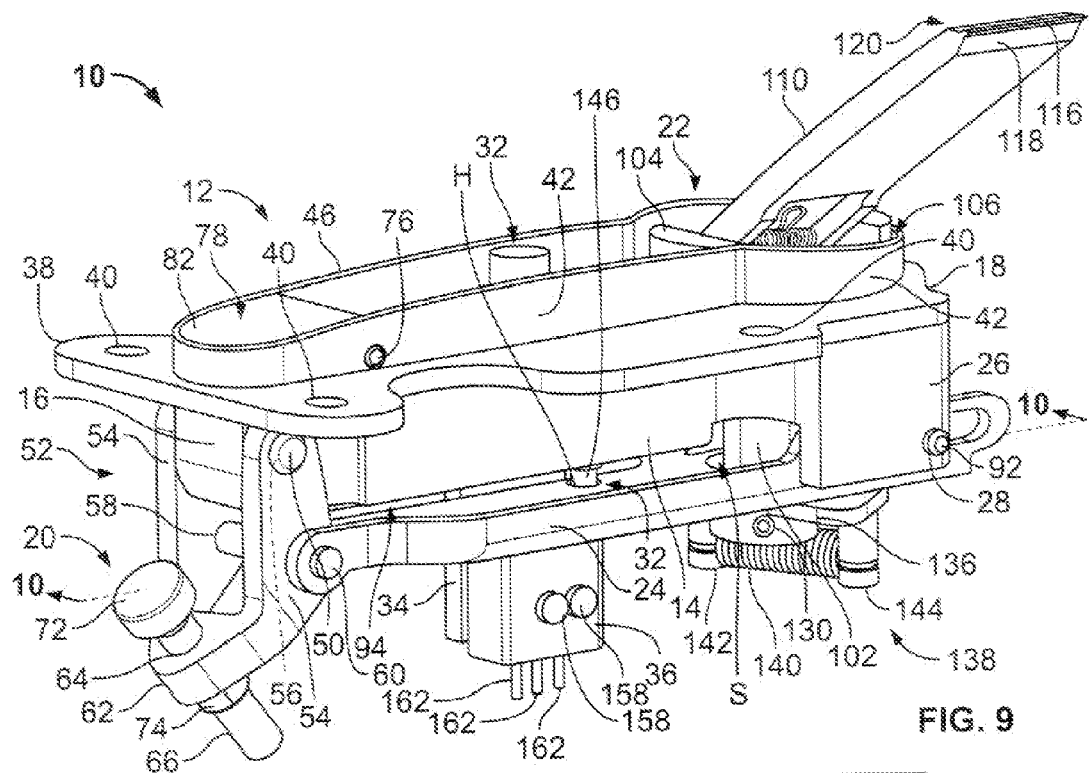
FIG. 9 is a top perspective view of the rotary-handle latch illustrated by FIG. 7, but shown in an open position.
Figure 10:
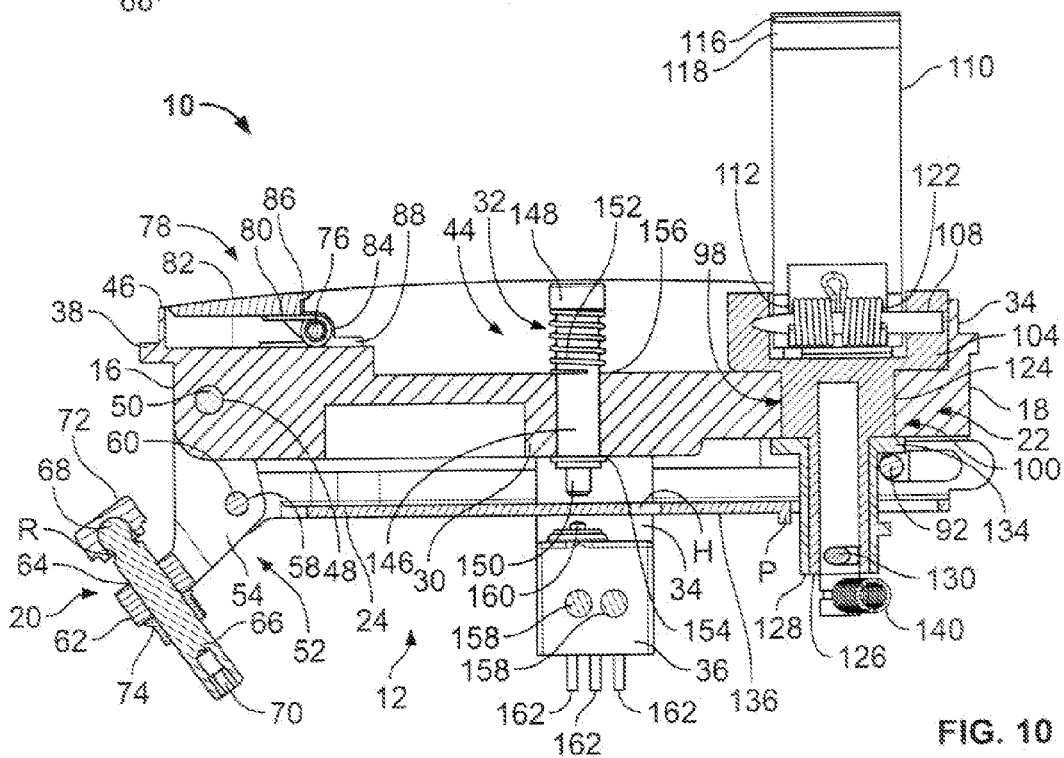
FIG. 10 is a cross-sectional view of the rotary-handle latch shown in FIG. 9, taken along the arrow 10-10 of FIG. 9 and looking in the direction of the arrows.
Figure 11:
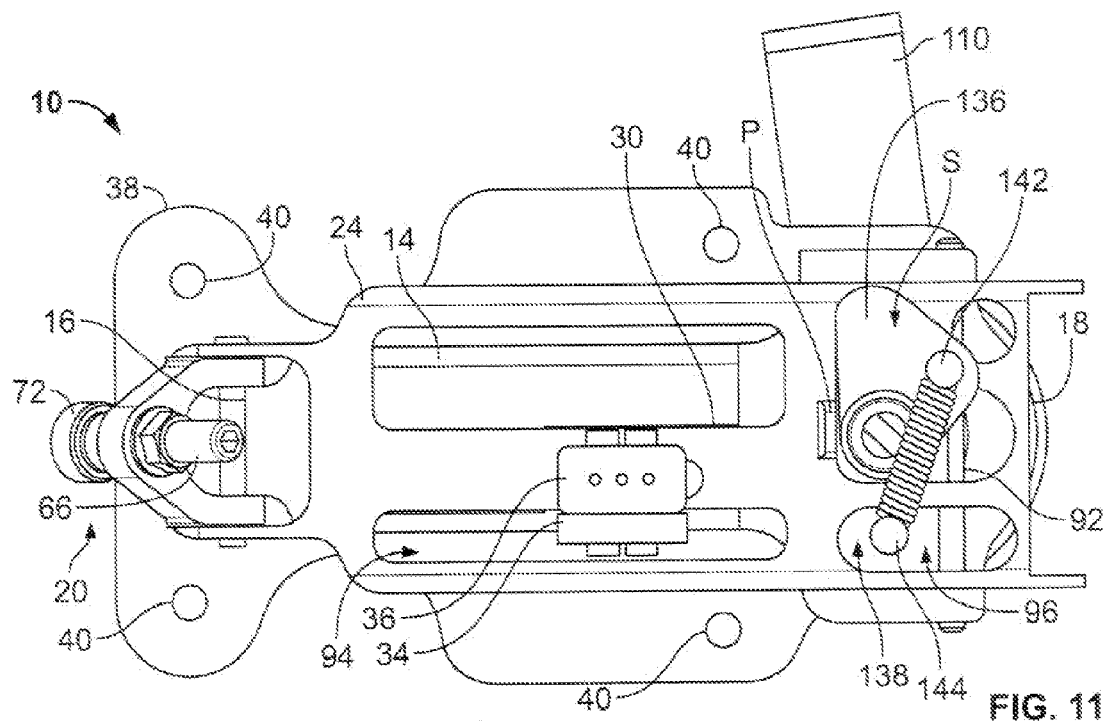
FIG. 11 is a bottom view of the rotary-handle latch shown in FIG. 9.

In an embodiment, a handle mechanism includes a handle 110 that has two collars 112 is pivotally attached to the head 104 of the drive shaft 100 by the pin 108 that extends through the collars 112 (for example see FIG. 4). In an embodiment, the handle 110 is used to manually rotate the rotary assembly 22, in order to open and close the latch 10, in manners that are described hereinafter. In an embodiment, the handle 110 has a pad 114 that is formed on the end of the handle 110 that is proximate to the pin 108 (for example see FIG. 4) and a lip 116 (see FIG. 1) that is formed on the opposite end. In an embodiment, the lip 116 has a ramp 118 and a groove 120 (see FIG. 1) that is positioned opposite the ramp 118, for purposes that are described hereinbelow. In an embodiment, a torsion spring 122 (see FIG. 4) is also fitted on the pin 108. The torsion spring 122 biases the handle 110 to rotate in a direction in which the lip 116 of the handle 110 is oriented in a pop-up position (see for example FIGS. 7 and 8) or in an open position (see for example FIGS. 9 and 10). In an embodiment, when the handle 110 is in the pop-up position or in the open position, the pad 114 of the handle 110 is in contact with the head 104 (for example see FIG. 8), and the handle 110 is therefore restricted from further rotation outwardly from the latch 10. In an embodiment, when the handle 110 is pivoted from the pop up position to the closed position, the ramp 118 bears against the lip 86 of the push button 82, thereby rotating the push button 82 until the lip 116 of the handle 110 slips under the lip 86 of the push button 82, and the lip 86 of the push button 82 is urged by the torsion spring 80 of the trigger 78 to bear on the groove 120 of the handle 110, thereby retaining the handle 110 in the closed position. In an embodiment, when the push button 82 is pressed, the push button 82 rotates until the lip 86 of the push button 82 is free of contact with the lip 116 of the handle 110, and the handle 110 is then urged to rotate to the pop-up position by the torsion spring 122.

In an embodiment, the drive shaft 100 has a cylindrical base 124 (see FIG. 4) that is positioned in the bore 98 of the rotary assembly hub 18 and is supported therein by the frame 14. In an embodiment, a hollow cylindrical shank 126 extends outwardly from the base 124. In an embodiment, the shank 126 may be integrally formed with the base 124. In an embodiment, the axes of rotation of the base 124 and the shank 126 are coincident with each other, and since the base 124 and the shank 126 are connected, they rotate as one piece.

Referring to FIGS. 2-6 and FIG. 12, in an embodiment, the cam 102 is attached to the shank 126 of the drive shaft 100. More particularly, in an embodiment, the cam 102 has a hollow cylindrically shaped channel 128 that is centered about its longitudinal axis. In an embodiment, the inside diameter of the channel 128 is sized slightly larger than the outside diameter of the shank 126 so that the shank 126 may be inserted inside the channel 128. In an embodiment, the cam 102 is fastened to the shank 126 by a rivet 130 that extends thought the cam 102 and the shank 126 (for example see FIG. 4). In an embodiment, the axes of rotation of the base 124, the shank 126, and the cam 102 are coincident with each other, and they all rotate in the rotary assembly hub 18 as one element.

Figure 6:
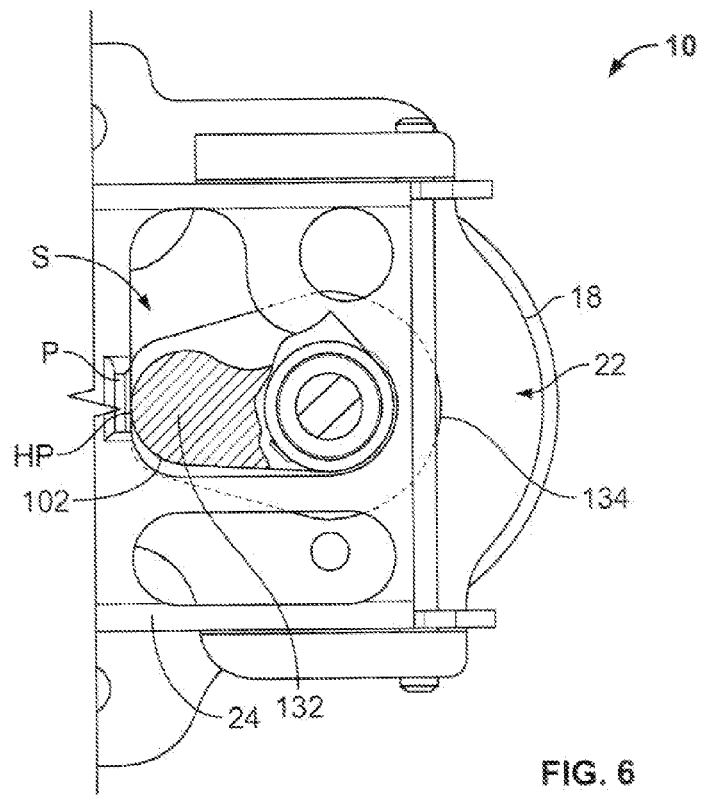
FIG. 6 is an enlarged partial view of a portion of the rotary-handle latch illustrated by FIG. 5 showing a cam positioned in an L-shaped slot on a slide plate.
Figure 12:
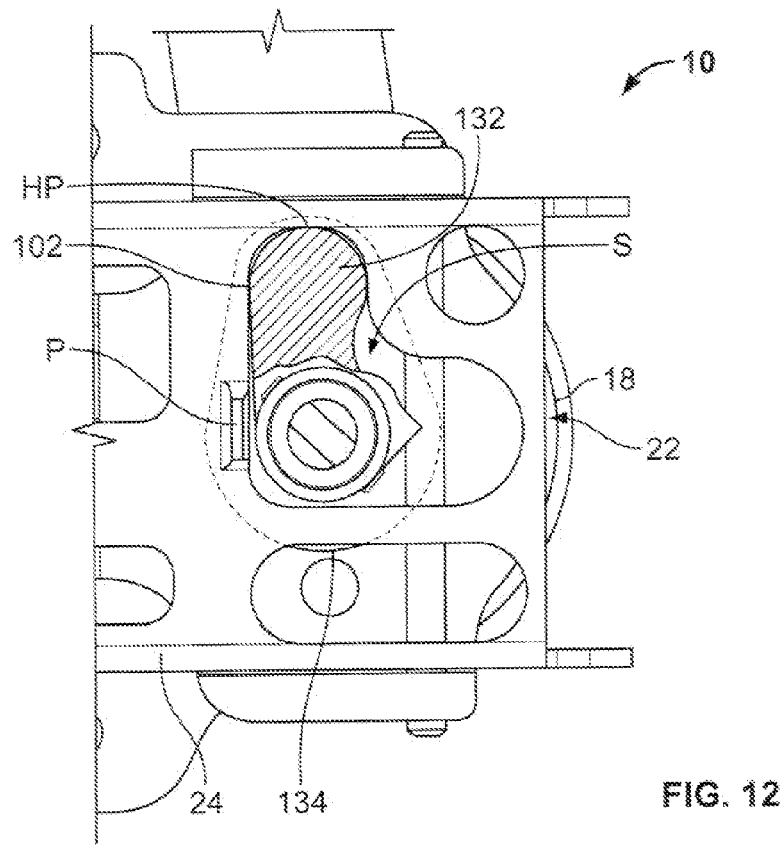
FIG. 12 is an enlarged partial view of a portion of the rotary-handle latch illustrated by FIG. 11 showing the cam positioned in the L-shaped slot on the slide plate.

Referring to FIGS. 6 and 12, in an embodiment, the cam 102 has a lobe 132 with an interior lip 134 that is formed on its interior end, and a platform 136 that is formed on its exterior end. In an embodiment, the lobe 132 has a high point HP. In an embodiment, the lobe 132 of the cam 102 is positioned in the L-shaped slot S of the slide plate 24, so that when the handle 110 is in the closed position or the pop-up position (see FIGS. 3-8), the high point HP of the lobe 132 is pointed in the longitudinal direction of the latch 10 (see FIG. 6) and the slide plate 24 is positioned and maintained in the fully extended position. In an embodiment, the swivel arm 52 is positioned outwardly from the swivel arm hub 16 and the cap 72 of the bolt 66 is positioned and maintained against the door jam of the compartment (not shown in the Figures). In an embodiment, when the handle 110 is rotated to the open position (see FIGS. 7-12), the high point HP of the lobe 132 is transversely oriented (see FIG. 12). In this configuration, the slide plate 24 is positioned and maintained in the fully retracted position, and the swivel arm 52 is positioned inwardly towards the swivel arm hub 16 and the cap 72 of the bolt 66 is positioned and maintained in the open position (i.e., away the door jam of the compartment).

In an embodiment, the interior lip 134 of the cam 102 bears against the frame 14 thereby restraining any movement of rotary assembly 22 in bore 98 in the direction of the longitudinal axis towards the handle 110 (see FIG. 4). It is understood that the restraint of any movement of the rotary assembly 22 in bore 98 in the direction of the longitudinal axis away from the handle 110 is provided by the head 104 of the drive shaft 100 bearing on the frame 14 (see FIG. 4). In an embodiment, the protrusion P bears on the platform 136 of the cam 102, when the handle 110 is in closed position. This inhibits any side-to-side rotational movement of the handle 110 within the well 44 of the frame 14, which inhibits vibration of the latch 10. In an embodiment, the platform 136 also supports a portion of a toggle assembly 138, for purposes that are described below.

In an embodiment, the toggle 138 assembly straddles the platform 136 of the cam 102. More particularly, in an embodiment, the toggle assembly 138 has a toggle spring 140 that is attached to a short post 142 at one end and a long post 144 at the opposite end. In an embodiment, the short post 142 is mounted on the platform 136 of the cam 102, and the long post 144 is mounted on frame 14. In an embodiment, the slot 96 of the slide plate 24 permits the long post 144 to extend through the slide plate 24 without interfering with the slide plate 24 when it slides in the longitudinal direction of the latch 10. In an embodiment, when the longitudinal axis of the toggle spring 140 is centered over the axis of rotation of the rotary assembly 22, the toggle spring 140 exerts no torque on the rotary assembly 22. However, when the longitudinal axis of the toggle spring 140 is positioned proximate the pin 92 (i.e., it is located behind the center of the rotational axis of the rotary assembly 22), the toggle spring 140 exerts a torque that urges the rotary assembly 22 to rotate the handle 110 to the open position. Likewise, when the longitudinal axis of the toggle spring 140 is positioned forward of the center of the rotational axis of the rotary assembly 22, the toggle spring 140 exerts a torque that urges the rotary assembly 22 to rotate the handle 110 to the pop up position.

Referring to FIGS. 1-5, 8, 10 and 11, the midsections of the frame 14 (i.e., the plunger assembly 32 and the micro-switch 36) are now described. In an embodiment, the plunger assembly 32 includes a plunger 146, which includes a head 148 and a tip 150 located opposite the head 148. In an embodiment, the plunger 146 has a coil spring 152 that is positioned proximate the head 148 and a retainer 154 that is positioned proximate the tip 150. In an embodiment, the plunger assembly 32 is installed in a bore 156 that is formed in the block 30 of the frame 14 so that the plunger 146 slides freely therein. In an embodiment, the coil spring 152 biases the plunger 146 in the direction away from the micro-switch 36.

In an embodiment, the micro-switch 36 is releasably fastened to the mounting plate 34 by a pair of mounting screws 158. In an embodiment, the micro-switch 36 has an actuator button 160 that is located proximate the tip 150 of the plunger 146, and wire terminals 162 that are located opposite the actuator button 160. In an embodiment, the micro-switch 36 is oriented on the mounting plate 34 so that the actuator button 160 is in alignment with the longitudinal axis of the plunger 146. In an embodiment, when the handle 110 is in the closed position, the tip 150 of the plunger 146 is pressed downwardly through the hole H of the slide plate 24 and it contacts the actuator button 160 (see FIG. 4). In an embodiment, when in the closed position, the circuitry of the micro-switch 36 provides a signal that is conveyed to the wire terminals 162. In an embodiment, the signal provides an indication that the latch 10 is fully closed and locked. In an embodiment, when the handle 110 is in the pop-up position or the open position (see FIGS. 9 and 11), the tip 150 of the plunger 146 is urged away from the actuator button 160 of the micro-switch 36 and it is retracted out of the hole H of the slide plate 24. In an embodiment, the micro-switch provides a signal indicating that the latch 10 is not fully closed and locked.

In an embodiment, all of the elements of the latch 10, except the frame 14, the handle 110, and the cap 72 of the bolt 66, may be made out of stainless steel. In an embodiment, the frame 14 and the handle 110 may be made out of aluminum, and the cap 72 may be made of a durable polymer material. Having described the structure of the latch 10, the operation of the latch 10 is now described below.

In operation, referring to FIGS. 3-6, the latch 10 is shown in the closed position. More particularly, the handle 110 has been rotated so that the rotary assembly 22 has rotated the cam 102 in the slot S to the open position (see FIG. 6), wherein the high point HP of the lobe 132 is pointing in the longitudinal direction of the latch 10 and the slide plate 24 is positioned and maintained in the fully extended position. In this configuration, the swivel arm 52 is positioned outwardly away from the swivel arm hub 16. In the closed position, the cap 72 of the bolt 66 is positioned and maintained in the closed position (i.e., bearing against the door jam of the compartment) thereby retaining the door securely in the fully closed and locked position. In the closed position, the handle 110 depresses the actuator button 160 of the micro-switch 36 so that the circuitry of the micro-switch 36 provides a signal that provides an indication that the latch 10 is fully closed and locked.

Figure 7:
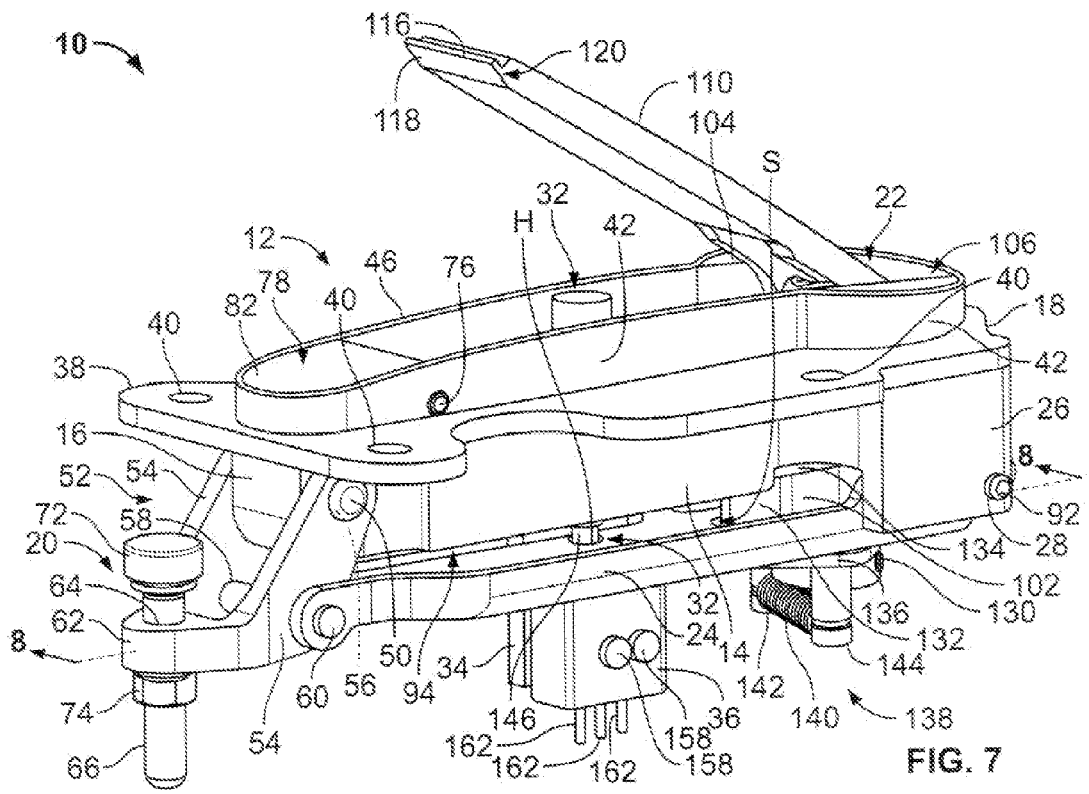
FIG. 7 is a top perspective view of the rotary-handle latch illustrated by FIG. 3, but being shown in a pop up position.
Figure 8:
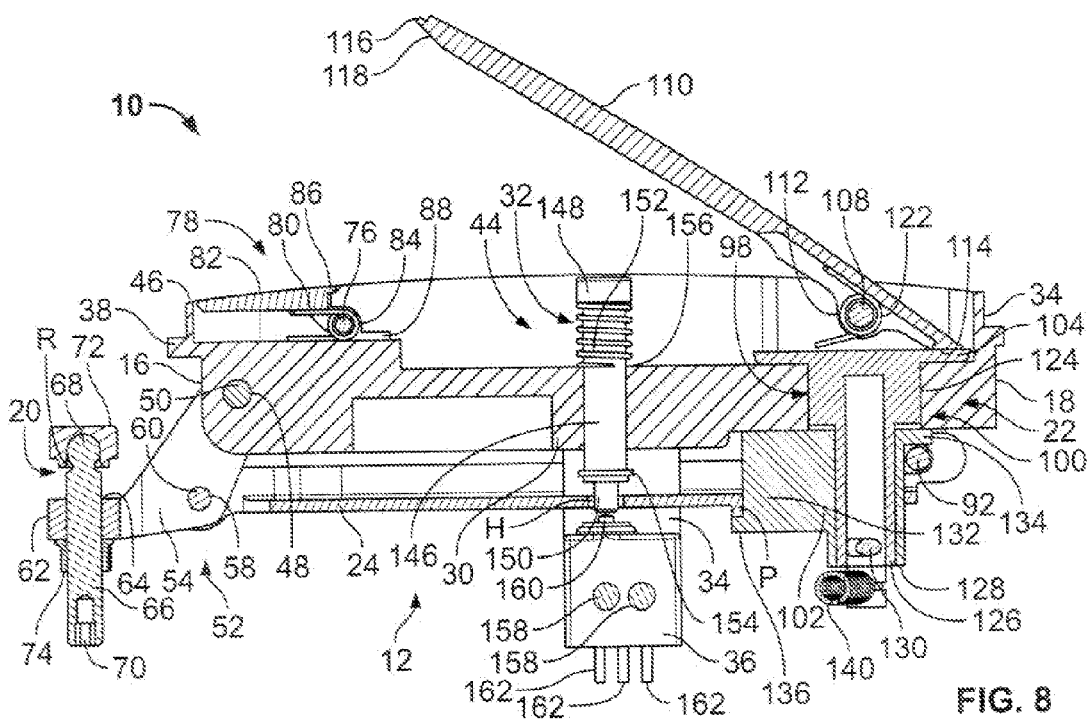
FIG. 8 is a cross-sectional view of the of the rotary-handle latch shown in FIG. 7, taken along the arrow 8-8 of FIG. 7 and looking in the direction of the arrows.

Referring to FIGS. 7 and 8, the latch 10 is shown in the pop-up position. To achieve this position, the push button 82 of the trigger 78 has been pushed and the handle 110 is released in the manner described hereinabove, wherein the torsion spring 122 biases the handle 110 to rotate to the pop-up position. In this position, the plunger 146 releases the actuator button 160 of the micro-switch 36 so that the circuitry of the micro-switch 36 provides a signal that provides a flight crewmember an indication that the latch 10 is not fully closed and locked.

Referring to FIGS. 9-12, the latch 10 is shown in the open position. More particularly, the handle 110 has been rotated from the pop-up position to the open position in the manner described hereinabove so that the cap 72 of the bolt 66 is positioned and maintained in the open position (i.e., away from the door jam of the compartment). In the open position, the handle 110 releases the plunger 146 from contact with the actuator button 160 of the micro-switch 36. More particularly, the tip 150 of the plunger 146 is biased away from the actuator button 160 of the micro-switch 36 and is withdrawn out of the hole H of the slide plate 24. In this position, the circuitry of the micro-switch 36 provides a signal that provides a flight crewmember an indication that the latch 10 is not fully closed and locked.

In an embodiment, the handle 110 may then be returned to the closed position in the manner described hereinabove. More particularly, in an embodiment, the lip 86 of the push button 82 is urged by the torsion spring 80 of the trigger 78 to bear on the groove 120 of the handle 110, thereby retaining the handle 110 in the closed position. In the closed position, the handle 110 depresses the actuator button 160 of the micro-switch 36 so that the circuitry of the micro-switch 36 again provides a signal that provides a flight crewmember an indication that the latch 10 is fully closed and locked.

In an embodiment, the micro-switch 36 is positioned so that it is accessible and may be replaced by removing the mounting screws 158 from the mounting plate 34. In an embodiment, the micro-switch 36 employs a direct activation of the actuator button 160 (i.e., via the tip 150 of the plunger 146 directly contacting the actuator button 160). In an embodiment, the means for opening and closing the latch 10

(e.g., the interaction between the lip 86 of the trigger 78 and the lip 116 and the groove 120 of the handle 110) is simple and therefore reliable. In an embodiment, in the closed position, the handle 110 and the edge 46 of the wall 42 are flush with the exterior surface of the door and therefore they do not substantially alter the boundary layer flow over the exterior of the aircraft while it is in flight. In an embodiment, the latch 10 allows for direct visual inspection to determine if the external door is fully closed and locked (i.e., via observing that the handle 110 is not in the pop-up or open position), and provides a visual warning signal to a flight crewmember that the external door is not fully closed and locked (i.e., via the signal provided by the wire terminals 162 of the micro-switch 36).

It will be understood that the embodiments described herein are merely exemplary and that a person skilled in the art may make many variations and modifications without departing from the spirit and scope of the invention. For instance, in an embodiment, the slide plate 24 may be replaced with a means for linking the rotary assembly hub 18 with the swivel arm hub 16, such as a rigid rod (not shown) that is pivotally attached to the cam 102 on one end and the swivel arm 52 on the opposite end. In an embodiment, the latch 10 may be used for doors and access panels for aircraft, such as fuselages, nacelles, engine cowlings, radomes, etc. In other embodiments, the latch 10 can be used in other suitable environments and for other vehicles and structures. In other embodiments, the latch can be configured as a pin latch or other suitable latch, such as a hook latch. All such variations and modifications are intended to be included within the scope of the invention as defined in the appended claims.

What is claimed is:

1. A latch, comprising:
  a base having a first end, a second end opposite the first end, a longitudinal axis extending from the first end to the second end, and a frame having a swivel arm hub located proximate to the first end and a rotary assembly hub located proximate to the second end;
  a rotary assembly supported by the rotary assembly hub, the rotary assembly including a drive shaft mounted rotatably within the rotary assembly hub and a cam attached to the drive shaft;
  a handle mechanism including a handle having a first end and a second end opposite the first end of the handle, and a trigger, wherein the second end of the handle is attached pivotally to the drive shaft of the rotary assembly such that the handle is moveable between a closed position, in which the trigger is releasably engaged with the second end of the handle, and a pop-up position, in which the trigger is disengaged from the second end of the handle and the second end of the handle is pivotally positioned in a direction away from the frame, and wherein the handle is moveable between the pop-up position and an open position, in which the handle is rotated relative to the longitudinal axis of the base;
  a slide plate having a first end, a second end opposite the first end of the slide plate, and a hole formed intermediate with the first and second ends of the slide plate, the second end of the slide plate being attached slidably to the second end of the base, and wherein the cam is engaged with the slide plate proximate to the second end of the slide plate;
  a swivel arm having a first portion attached pivotally to the swivel arm hub of the of the frame the base and a second portion attached pivotally to the first end of slide plate;
  a bolt assembly attached to the swivel arm; and
  a plunger assembly mounted within the base intermediate the first and second ends of the base, the plunger assembly including a plunger that is moveable between an extended position, in which the plunger is adapted to engage an electrical switch, and a retracted position, in which the plunger is disengaged from the electrical switch, the plunger assembly further including a spring for facilitating movement of the plunger from its extended position to is retracted position,
  wherein the hole of the slide plate is sized and shaped to receive the plunger of the plunger mechanism, wherein when the plunger is in its retracted position, the plunger is positioned through the hole of the slide plate, and when the plunger in its extended position, the plunger is positioned external of the hole,
  wherein when the handle is in its closed position, the handle engages the plunger to maintain it in its dosed position and the bolt assembly is adapted to engage an external structure, and when the handle is in its pop-up position, the handle is disengaged from the plunger and the plunger moves to its retracted position,
  wherein when the handle is moved from its pop-up position to its open position, the drive shaft and the cam are rotated such that the cam draws the slide plate in a direction towards the second end of the base, and, in turn, the swivel arm pivots to swing the bolt assembly to disengage the bolt assembly from the external structure, and
  wherein the electrical switch is adapted to provide a first signal indicating that the latch is in a locked position when the handle is in its closed position, and a second signal indicating that the latch is in an unlocked position when the handle is in its pop-up position or its open position.

2. The latch of claim 1, wherein the electrical switch includes an actuator button that is adapted to be engaged by the plunger when the plunger is in its extended position, wherein when the plunger engages the actuator button, the electrical switch provides the first signal, and when the plunger is disengaged from the actuator button, the electrical witch provides the second signal.

3. The latch of claim 2, further comprising a mounting data attached to the base, the electrical switch being mounted removably to the mounting plate.

4. A latch, comprising:
  a base having a first end, a second end opposite the first end, a longitudinal axis extending from the first end to the second end, and a frame having a swivel arm hub located proximate to the first end and a rotary assembly hub located proximate to the second end,
  a rotary assembly supported by the rotary assembly hub, the rotary assembly including a drive shaft mounted rotatably within the rotary assembly hub and a cam attached to the drive shaft;
  a handle mechanism including a handle having a first end and a second end opposite the first end of the handle, and a trigger, wherein the second end of the handle is attached pivotally to the drive shaft of the rotary assembly such that the handle is moveable between a closed position, in which the trigger is release to engaged with the second end of the handle and a pop-up position, in which the trigger is disengaged from the second end of the handle and the second end of the handle is pivotally positioned in a direction away from the frame, and wherein the handle is moveable between the pop-up position and an open position, in which the handle is rotated relative to the longitudinal of the base;
  a slide plate having a first end and a second end opposite the first end of the slide plate, the second end of the slide plate being attached slidably to the second end of the base, and wherein the carte is engaged with the slide plate proximate to the second end of the slide plate;

a swivel arm having a first portion attached pivotally to the swivel arm hub of the base and a second portion attached pivotally to the first end of the slide plate;

a bolt assembly attached to the swivel the bolt assembly including a bolt, a ball attached to a first end of the bolt, and a swivel cap attached movably to the ball; and a plunger assembly mounted within the base intermediate first and second ends of the base, the plunger assembly including a plunger that is moveable between an extended position, in which the plunger is adapted to engage an electrical switch, and a retracted position, in which the plunger is disengaged from the electrical switch, wherein when the handle is in its closed position the handle engages the plunger to maintain it in its closed position and the bolt assembly is adapted to engage an external structure, and when the handle is in its pop-up position, the handle is disengaged from the plunger and the plunger moves to its retracted position, wherein when the handle is moved from its pop-up position to its open position, the drive shaft and the cam are rotated such that the cam draws the slide plate in a direction towards the second end of the base, and, in turn, the swivel arm pivots to swing the bolt assembly to disengage the bolt assembly from the external structure, and wherein the swivel cap of the bolt assembly is adapted to engage the extern structure when the handle is in either its closed position or its pop-up position.

5. The latch of claim 1, wherein the base includes at least one pin mounted proximate to the second end of the base, and the slide plate includes at least one elongated slot that is sized and shaped to receive the pin, and wherein the slide plate is adapted to be guided by the pin.

6. The latch of claim 1, wherein the frame includes an outwardly projecting wall having an edge that is positioned flush with the external structure when the latch is installed therein.

7. The latch of claim 6, wherein the wall forms a well that is sized and shaped to receive the handle when the handle is in its closed position, and wherein when the handle is in its closed position, an exterior surface of the handle is positioned flush with the edge of the wall.

8. The latch of claim 1, wherein the handle mechanism further includes a torsion spring engaged with the handle for biasing the handle toward its pop-up position.

9. The latch of claim 8, wherein the trigger is attached rotatably to the base and includes a first lip, and the handle includes a second lip having a ramp and a groove, and herein when the handle is moved from its pop-up position to its closed position, the ramp of the handle bears against the first lip of the trigger so as to rotate the trigger until the second lip of the handle engages the first of the trigger, thereby retaining the handle in its closed position.

10. The latch claim 9, wherein the trigger includes a spring for biasing trigger to bear on the groove of the handle to maintain the handle in its closed position.

11. The latch of claim 4, herein the bolt assembly includes a locknut threaded on a second end of the bolt opposite the first end of the bolt, and wherein the locknut is adapted to adjust and lock the position of the bolt relative to the external structure.

12. A latch, comprising:
a having a first end, a second end opposite tape first end, a longitudinal axis extending from the first end to the second end, and a frame having a swivel arm hub located proximate to the first end and a rotary assembly hub located proximate to the second end;

a rotary assembly supported by the rotary assembly hub, the rotary assembly including a drive shaft mounted rotatably within the rotary assembly hub and a cam attached to the drive shaft;

a handle mechanism including a handle having a first end and a second end opposite the first end of the handle, and a trigger, wherein the second end of the handle is attached pivotally to the drive shaft of the rotary assembly such that the handle is moveable between a closed position, in which the trigger is releasably engaged with the second end of the handle, and a pop-up position, in which the trigger is disengaged from the second end of the handle and the second end of the handle is pivotally positioned in a direction away from the frame, and wherein the handle is moveable between the pop-up position and an open position, in which the handle is rotated relative to the longitudinal axis of the base;

a slide plate having a first end, a second end opposite the first end of the slide plate, and a channel formed longitudinally between the first and second ends of the slide plate, the channel adapted to receive a mounting block, the second end of the slide plate being attached slidably to the second end of the base, and wherein the cam is engaged with the slide plate proximate to the second end of the slide plate;

a swivel of arm having a first portion attached pivotally to the swivel arm hub of the base and a second portion attached pivotally to the first end of the slide plate;

a bolt assembly attached to the swivel arm: and a plunger assembly mounted within the base intermediate the first and second ends the base, the plunger assembly including a plunger that is moveable between an extended position, in which the plunger is adapted to engage an electrical switch, and a retracted position, in which the plunger is disengaged from the electrical switch, wherein when the handle is in its closed position, the handle engages the plunger to maintain it in its closed position and the bolt assembly is adapted to engage an external structure, and when the handle is in its pop-up position, the handle is disengaged from the plunger and the plunger moves to its retracted position, wherein when the handle is moved from its pop-up position to is open position, the drive shaft and the cam are rotated such that the cam draws the slide plate in a direction towards the second end of the base, and, in turn, the swivel arm to swing the bolt assembly to disengage the holt assembly from the external structure.

* * * * *

UNITED STATES PATENT AND TRADEMARK OFFICE
CERTIFICATE OF CORRECTION

| | | |
|---|---|---|
| PATENT NO. | : 8,646,819 B2 | Page 1 of 1 |
| APPLICATION NO. | : 13/285323 | |
| DATED | : February 11, 2014 | |
| INVENTOR(S) | : Thai Do | |

It is certified that error appears in the above-identified patent and that said Letters Patent is hereby corrected as shown below:

In the Specification
Column 3, line 53, insert --to-- between "are" and "be";
Column 6, line 37, delete "thought" and insert --through--;

In the Claims

Column 9, line 63, claim 1, delete "of the";
Column 9, line 63, claim 1, insert --of-- between "frame" and "the";
Column 10, line 15, claim 1, delete "dosed" and insert --closed--;
Column 10, line 39, claim 2, delete "witch" and insert --switch--;
Column 10, line 40, claim 3, delete "data" and insert --plate--;
Column 10, line 58, claim 3, delete "release to" and insert --releasably--;
Column 11, line 2, claim 4, delete "carte" and insert --cam--;
Column 11, line 7, claim 4, insert --arm,-- between "swivel" and "the";
Column 11, line 17, claim 4, insert a --,-- between "position" and "the";
Column 11, line 31, claim 4, delete "extern" and insert --external--;
Column 11, line 52, claim 9, delete "herein" and insert --wherein--;
Column 11, line 56, claim 9, insert --lip-- between "first" and "of";
Column 11, line 58, claim 10, insert --of-- after "latch";
Column 11, line 59, claim 10, insert --the-- after "biasing";
Column 12, line 1, claim 11, delete "herein" and insert --wherein--;
Column 12, line 7, claim 12, insert --base-- between "a" and "having";
Column 12, line 7, claim 12, delete "tape" and insert --the--;
Column 12, line 59, claim 12, delete "holt" and insert --bolt--.

Signed and Sealed this
Third Day of June, 2014

Michelle K. Lee
*Deputy Director of the United States Patent and Trademark Office*